Sept. 29, 1953 R. L. MEISENHEIMER 2,654,072

DIRECT COUPLED MODULATION SYSTEM

Filed March 29, 1952

INVENTOR
Raymond L. Meisenheimer
BY
Charles H. Brown
ATTORNEY

Patented Sept. 29, 1953 2,654,072

UNITED STATES PATENT OFFICE 2,654,072

DIRECT COUPLED MODULATION SYSTEM

Raymond Lamar Meisenheimer, Haddonfield, N. J., assignor to Radio Corporation of America, a corporation of Delaware Application March 29, 1952, Serial No. 279,351

11 Claims. (Cl. 332—66)

Figure 1:
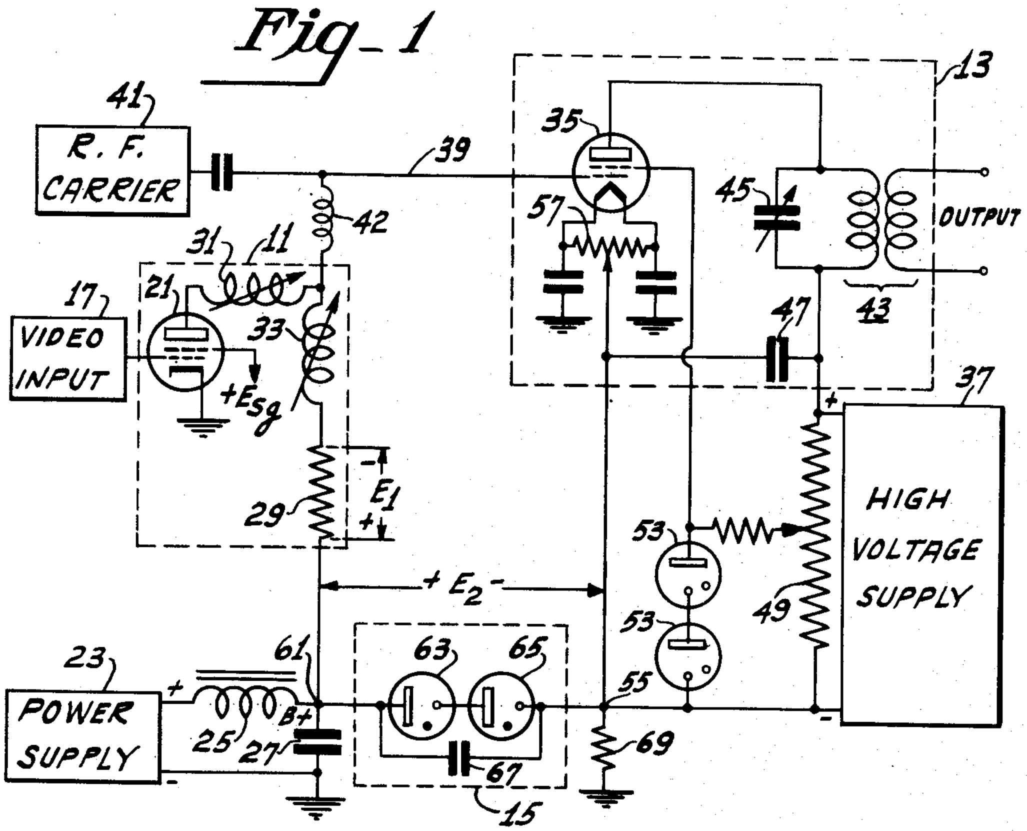

This invention relates to modulation systems and particularly to such systems wherein a signal amplifier stage is directly coupled to a modulated stage.

In directly coupling a signal amplifier stage to a modulated stage (in which case the signal amplifier stage is often referred to as a modulator stage), a difficult problem has existed, particularly in direct current coupled television modulator circuits, in furnishing the proper operating bias voltages to the modulated stage and at the same time providing a coupling from the signal amplifier to the modulated stage capable of passing low frequency and direct current components. Prior art circuit arrangements have not satisfactorily separated the control of the grid biasing voltage of the modulated stage from the anode current circuit of the signal amplifier stage.

The present invention provides a method of and apparatus for overcoming the difficulties arising out of this lack of separate control. The direct coupling between the signal amplifier and the modulated stage is simplified in the present invention, which also eliminates the need for a separate power supply heretofore required to furnish operating grid bias for the modulated stage. No shunt reactance is added to the load circuit of the signal amplifier stage, as is the case when a separate bias supply is utilized. Hum is also reduced in two ways by the system of the invention: first, by the elimination of a separate grid bias supply source; and second, by the exclusion of the signal amplifier stage power supply from the modulating circuit, as a result of which hum and voltage variations arising therein are substantially eliminated from the modulated stage.

Among the objects of the invention are: to provide an improved direct-coupled signal amplifier stage and modulated stage; to simplify the coupling in a direct-coupled modulation system; to provide separate controls for the anode current circuit of the signal amplifier stage and the grid biasing circuit of the modulated stage in a direct-coupled modulation system; to reduce the effects of hum and power supply voltage variation in a direct-coupled modulation system; and to improve the direct current coupling between the video modulator and the video modulated stage in a television transmitter wherein a wide band of frequencies is utilized.

The foregoing objects are achieved, in accordance with the present invention, by providing a direct-coupled modulation system in which the grid-cathode circuit of the grid-modulated stage includes in series a load resistor of the signal amplifier (modulator) stage across which resistor the modulating voltage is developed, and a voltage difference circuit. This voltage difference circuit provides a control of the grid biasing voltage of the modulated stage separate from the anode current circuit of the signal amplifier stage. The voltage difference circuit is positioned at a point of zero signal potential and maintains a direct current reference for the modulated stage different from the direct current reference for the signal amplifier stage.

The system of the invention will be described with reference to a modulation system for imposing video information on a radio frequency carrier wave, for example, a direct coupled television transmitter modulator system; although it is to be understood that the arrangement may be employed for other types of modulation systems as well.

Figure 2:
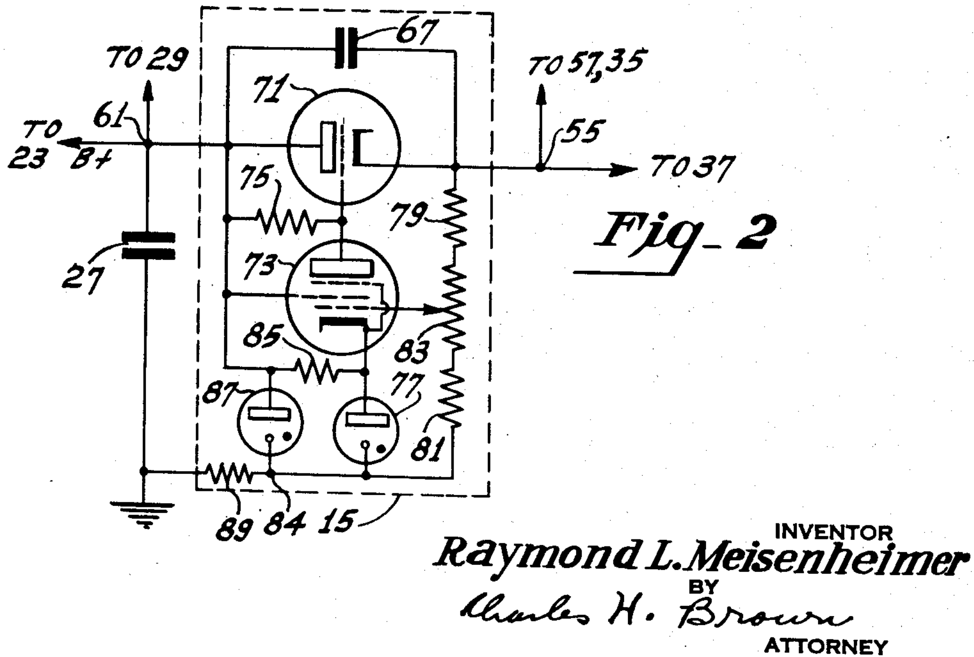

A more detailed description of the invention follows in connection with the accompanying drawings, in which:

Fig. 1 shows a direct coupled modulation system incorporating the present invention; and Fig. 2 shows a modification of one portion of the invention shown in Fig. 1.

Referring to Fig. 1, there is shown a direct coupled modulation system having a signal amplifier modulator stage shown within the dotted line box 11, a modulated amplifier stage shown within the dotted line box 13, and a grid biasing arrangement for the modulated amplifier stage 13 shown within the dotted line box 15. The signal amplifier or modulator stage 11 amplifies the output from a source of modulating potential derived, for example, from a video input circuit 17. The video input circuit 17 is coupled to the control grid of an evacuated electron discharge device 21 serving as a signal amplifier. The anode potential for the signal amplifier device 21 is supplied from a source of unidirectional potential, such as a power supply 23. The unidirectional potential from the power supply 23, after being subjected to filtering action by a series inductor 25 and a shunt filter capacitor 27, is impressed across the electron discharge device 21 and a load resistor 29. For television transmission, video peaking coils 31 and 33 are usually included in this series arrangement. The amplified output voltage from the signal amplifier stage 21 is developed across the load resistor 29.

The modulated amplifier stage 13 includes an evacuated electron discharge device 35 which is supplied with suitable high voltage unidirectional operating potential from a high voltage supply 37. The radio frequency carrier to be modulated is supplied to the control grid of the modulated amplifier discharge device 35 from a suitable carrier source 41. The amplified video information from the signal amplifier stage 11 is coupled by a connection 39 capable of passing direct current to the same control grid through a radio frequency isolating choke 42. The modulated amplifier stage 13 also includes a resonant output circuit shown as including a primary winding of an output transformer 43 and a tuning capacitor 45 in parallel therewith. A radio frequency bypass capacitor 47 is connected between the cathode of the modulated amplifier device 35 and that side of the resonant output circuit 43, 45 which is farthest removed from the anode of the modulated amplifier discharge device 35 in order to shunt the high voltage power supply 37 for radio frequency currents.

Regulated operating potential for the screen grid electrode of the electron discharge device 35 may also be furnished from the high voltage supply 37 by means of a potentiometer or tapped connection of a voltage divider 49. Two voltage regulator tubes 53 in series between the negative reference point terminal 55 of the high voltage supply 37 and the screen grid of the electron discharge device 35 are shown as the regulating means.

The filamentary cathode of the modulated amplifier discharge device 35 is connected to the negative reference point terminal 55 of the high voltage supply 37 through a center-tapped filament resistor 47. Filament heating current from a source, not shown, is supplied to the filamentary cathode of the modulated amplifier discharge device 35 in the usual manner by being connected directly across the filament leads.

Suitable grid biasing voltage for the modulated amplifier discharge device 35 is obtained, according to this invention, by inserting a voltage difference circuit between the negative reference point 55 for the modulated amplifier stage 13 and the point of zero signal potential 61 at the B+ side of the signal amplifier stage power supply 23. The voltage difference circuit 15 is composed of two voltage regulator tubes 63, 65 in series, having a video bypass capacitor 67 in shunt therewith. A dropping resistor 69 is connected between the negative reference point terminal 55 of the high voltage supply 37 and the negative terminal of the signal amplifier stage power supply 23, shown as grounded.

For an example of one condition of operation, the modulation system of the present invention is adjusted with no radio frequency carrier excitation from the carrier source 41 and a voltage on the grid of the signal amplifier electron discharge device 21 which gives the minimum expected anode current for the electron discharge device 21. This steady state current through the signal amplifier electron discharge device 21 creates a voltage drop across the load resistor 29, making the end of the load resistor 29 nearest the control grid of the modulated amplifier discharge device 35 more negative than the point of zero signal potential 61. This voltage difference is indicated on the drawing and denoted $E_1$. The voltage dropping resistor 69 draws current through the series voltage regulator tubes 63, 65 from the signal amplifier stage power supply 23, making the negative reference point terminal 55 also more negative than the point of zero signal potential 61. This potential difference is also indicated on the drawing and is designated $E_2$. The value of $E_2$ is adjusted so that $E_1$ exceeds $E_2$ by the amount of bias required to just cut off the anode current of the modulated amplifier discharge device 35.

In this condition of adjustment, when radio frequency energy is supplied from the radio frequency carrier source 41, the modulated amplifier electron discharge device 35 will conduct on positive half-cycles of the radio frequency carrier. The angle of anode current flow will be 180°, and the output of the modulated amplifier stage 13 will have a fundamental component at the carrier frequency.

When a video signal is applied from the video input 17, a video voltage will appear across the load resistor 29 of the signal amplifier stage 11. At certain values of video voltage, more current will flow through the signal amplifier electron discharge device 21, giving a greater voltage drop across the load resistor 29. These values of voltage will drive the grid of the modulated power amplifier electron discharge device 35 beyond cutoff, and the peak value of the plate current pulses therein will be reduced as well as the angle of anode current flow. The resulting signal appearing across the output circuit 43, 45 of the modulated power amplifier 13 is therefore amplitude modulated in accordance with the information from the video input circuit 17. The action of the voltage difference circuit 15 shown in Fig. 1 is to establish a constant voltage drop between the point of zero signal potential 61 at the B+ side of the signal amplifier stage power supply 23 and the negative reference terminal 55 of the high voltage supply 37. Gas-filled electron discharge devices, such as the voltage regulator tube 63, 65, have the property of providing a constant voltage drop which is nearly completely independent of the current passing therethrough within fairly wide limits. Once the values of the voltage drops $E_1$ and $E_2$ in the grid-cathode circuit of the modulated amplifier discharge device 35 are established, the resultant grid biasing voltage remains constant.

The present system attains the advantages of direct coupling a signal amplifier stage to a modulated stage and at the same time obviates many of the heretofore attendant difficulties. Changes in the signal amplifier stage power supply voltage, for example, between the point of zero signal potential 61 and ground, are essentially eliminated from the grid biasing circuit of the modulated power amplifier stage 13. As is known, tetrodes and pentodes have a plate current characteristic which is not greatly affected by power supply variations. Because of this stability, the changes in steady state current through the load resistor 29 are of insignificant magnitude. Furthermore, the grid return circuit for the modulated amplifier stage 13 is through the load resistor 29 of the signal amplifier stage 11, the video bypass capacitor 67 and voltage dropping circuit in parallel, and the center-tapped filament resistor 57, and therefore does not include the unregulated signal amplifier power supply 23. Consequently, voltage fluctuations and hum arising in the signal amplifier stage power supply 23 are not directly impressed on the control grid of the modulated amplifier electron discharge device 35.

Since the voltage difference circuit 15 is inserted in the grid-cathode electrical path of the modulated amplifier discharge device 35 at a point of zero signal potential, the grid biasing arrangement of this direct coupled modulation system of this invention does not additionally load the signal amplifier stage 11. Further, the coupling of the signal amplifier stage 11 to the modulated amplifier stage 13 is capable of passing an extremely wide band of frequencies, even including direct current. This makes the subject direct coupled modulation system particularly suitable for television picture modulation.

The value of the dropping resistor 69 may be made variable to provide a control of the current drawn through the voltage regulator tube 63, 65 of the voltage difference circuit 15.

Fig. 2 shows an alternative form of a voltage difference circuit included within the dotted line box 15 which may be substituted for the corresponding box of Fig. 1. An evacuated electron discharge device load 71 is connected between the point of zero signal potential 61 and the negative reference terminal 55. A control evacuated electron discharge device 73 has its anode connected to the control electrode of the load electron discharge device 71 and also through a load resistor 75 to the same point of zero signal potential 61 at the positive side of the signal amplifier stage power supply. A voltage dividing circuit consisting of the series circuit of two resistors 79 and 81 and a tapped resistance 83 is utilized to establish the operating point of the control electron discharge device 73. The control grid of the control device 73 is directly connected to the adjustable tap on the resistor 83. The cathode of the control electron discharge device 73 is returned through a constant voltage dropping circuit, a gas regulator tube 77, to the negative side of the voltage dividing circuit, designated by the numeral 84. The operating bias for the control device 73 is obtained from the gas regulator tube 77.

The operating point of the gas regulator tube 77 is established by the resistor 85 in series between the gas regulator tube 77 and the positive side of the signal amplifier stage power supply 23.

A second gas regulator tube 87 is connected between the positive side of the signal amplifier stage power supply 23 and the negative side of the signal amplifier power supply 23, indicated as ground, through a series resistor 89. The resistor 89 is in series with the second gas regulator tube 87 and serves to establish the operating point of the second regulator tube 87, as well as furnish a return path from the negative side of the voltage dividing circuit, designated by the numeral 84.

It will be noted that a video bypass capacitor 67 is connected in shunt to the voltage difference circuit 15 shown in this figure.

The amount of current drawn from the signal amplifier stage power supply 23, for proper operation of the voltage difference circuit 15 of Fig. 2, is that which is sufficient to establish the operating point of the several electron tubes 71, 73, 77 and 87, and in addition that necessary to accommodate the maximum expected grid current of the modulated amplifier stage 13.

That this circuit within the dotted line box 15 acts to maintain a constant voltage difference $E_2$ may be understood from the following discussion. The voltage between the point of zero signal potential 61 and the negative side of the voltage divider circuit 84 is maintained constant by the second voltage regulator tube 87. When the grid current flows in the grid-cathode path of the modulated amplifier discharge device 35 of Fig. 1, the voltage drop across the load discharge device 71 is decreased. The voltage drop across the voltage divider circuit 79, 81, 83 is therefore increased because the voltage drop across this whole path including the load device 71 and the voltage divider circuit 79, 81, 83 is constant. The voltage applied to the control grid of the control device 73 by the tap on the tap resistance 83 is increased, resulting in more anode current flowing in the control device 73. More anode current thus flows through the load resistor 75, resulting in a decrease of voltage applied to the control electrode of the load discharge device 71 to increase the anode-cathode resistance of the load device 71. This action of increasing the anode-cathode resistance of the load device 71 increases the voltage drop across the load device 71 so that the negative reference point 55 is maintained at the same voltage difference with respect to the point of zero signal potential 61 as the value existing before the change in voltage took place. A similar explanation for the reverse condition, that is, where the point of zero signal potential at the positive side of the signal amplifier stage power supply 23 becomes more positive, and the control device 73 acts to decrease the anode-cathode resistance of the load device 71, also applies.

The circuit shown in Fig. 2, therefore, acts to maintain a constant value of $E_2$ in the system of Fig. 1 even in the presence of grid current flow from the modulated amplifier stage 13 which ordinarily would tend to "unload" the bias supply.

With the circuit arrangement shown in Fig. 2, the second voltage regulator tube 87 regulates only the inconsiderable amount of current which is drawn by the voltage difference circuit 15, making it unnecessary to provide expensive and complicated power supply regulation for the entire signal amplifier stage power supply 23.

I claim:

1. A direct coupled modulation system comprising a modulated amplifier discharge device having a cathode and a control electrode, a source of operating potential for said modulated amplifier device, a signal amplifier discharge device, a source of unidirectional operating potential for said signal amplifier device, a point of zero signal potential, a load connected between said signal amplifier device and said point of zero signal potential, a connection from the signal amplifier device side of said load to said control electrode of said modulated amplifier device, and a voltage difference circuit connected in series between said point of zero signal potential and said cathode of said modulated amplifier device.

2. In a direct coupled modulation system including a modulated amplifier discharge device having a cathode and a control electrode, and a signal amplifier discharge device directly connected to the control electrode of said modulated amplifier device through a path capable of passing direct current, the combination comprising a point of zero signal potential, a load in series between said signal amplifier device and said point of zero signal potential, and a constant voltage difference circuit connected between said point of zero signal potential and said cathode of said modulated amplifier device.

3. In a direct coupled modulation system including a modulated amplifier discharge device having a cathode and a control electrode, a signal amplifier discharge device, and a load circuit for said signal amplifier discharge device, said load circuit including therein a point of high signal potential and a point of zero signal potential; the combination comprising: a connection from said point of high signal potential to said control electrode of said modulated amplifier device, and a voltage difference circuit connected between said point of zero signal potential and said cathode of said modulated amplifier device.

4. A modulation system of the type wherein a signal amplifier stage is directly coupled to a modulated stage, comprising a load circuit for said signal amplifier having therein a point of high signal potential and a point of zero signal potential, a discharge device in said modulated stage having a cathode, an anode, and a control electrode, a connection from said point of high signal potential to said control electrode, and circuit means connected between said point and said modulated stage for maintaining a different direct current reference level therebetween, and an output circuit coupled to said anode.

5. The combination as defined in claim 4 wherein said circuit means comprises a voltage regulator circuit employing a series load electron discharge device and a shunt control electron discharge device.

6. The combination as defined in claim 1 wherein said voltage difference circuit comprises a series connected load electron discharge device and a shunt connected control electron discharge device, and said point of zero signal potential is the positive side of said source of unidirectional operating potential for said signal amplifier.

7. The combination as defined in claim 1 in which said voltage difference circuit comprises series connected voltage regulator tubes.

8. The combination as defined in claim 1 in which said voltage difference circuit comprises series connected voltage regulator tubes and said point of said zero signal potential is the positive side of said source of unidirectional potential for said signal amplifier device.

9. A modulation system comprising a modulated stage and a signal amplifier stage directly coupled thereto, a load circuit for said signal amplifier having therein a point of high signal potential and a point of zero signal potential, said modulated stage having a cathode, an anode, and a control electrode, a connection capable of passing direct current extending from said point of high signal potential to said control electrode, and circuit means including a constant voltage difference circuit maintaining a direct current reference level between said point of zero signal potential and said modulated stage which is different from the potential difference between said two points.

10. A modulation system comprising a first electron discharge device having grid, plate and cathode electrodes, a source of radio frequency energy coupled to said grid, an amplifier electron discharge device having an anode and another electrode, means for applying signal modulation to said other electrode of said amplifier, a connection capable of passing direct current coupled between said anode of said amplifier device and the grid of said first device, said connection including an inductance coil, a source of power supply for the plate of said amplifier, a resistor between the effective positive terminal of said last source and said coil, whereby the flow of current through said amplifier develops a voltage drop across said resistor, a direct current connection including a resistor from the cathode electrode of said first device to ground, and a voltage regulating circuit coupled between the cathode end of said last resistor and that end of said first resistor which is nearest said source of power supply, and means for bypassing said voltage regulator circuit for currents of signal frequency.

11. A modulation system in accordance with claim 10, wherein said signal modulation is a television video signal, and said system forms part of a television transmitting system.

RAYMOND LAMAR MEISENHEIMER.

References Cited in the file of this patent

UNITED STATES PATENTS

| Number | Name | Date |
|---|---|---|
| 2,490,428 | Gluyas | Dec. 6, 1949 |
| 2,570,789 | Gluyas | Oct. 9, 1951 |